（12) United States Patent
Abdullah et al.

(10) Patent No.: US 9,858,545 B1
(45) Date of Patent: Jan. 2, 2018

(54) SYSTEMS AND METHODS FOR ASSIGNING A PLANOGRAM TO A FIXTURE CORRESPONDING TO A FLOOR PLAN

(71) Applicant: WALGREEN CO., Deerfield, IL (US)

(72) Inventors: Erteza A. Abdullah, Lake Zurich, IL (US); Joshua P. Barrington, Villa Park, IL (US); Scott Sorenson, Lincolnshire, IL (US)

(73) Assignee: WALGREEN CO., Deerfield, IL (US)

( * ) Notice: Subject to any disclaimer, the term of this patent is extended or adjusted under 35 U.S.C. 154(b) by 81 days.

(21) Appl. No.: 14/505,887

(22) Filed: Oct. 3, 2014

(51) Int. Cl.
*G06Q 10/08* (2012.01)

(52) U.S. Cl.
CPC .................................. *G06Q 10/087* (2013.01)

(58) Field of Classification Search
None
See application file for complete search history.

(56) References Cited

U.S. PATENT DOCUMENTS

| 8,321,303 B1 | 11/2012 | Krishnamurthy et al. |
| 2009/0288030 A1 | 11/2009 | Wahl et al. |
| 2012/0022913 A1 | 1/2012 | Volkmann et al. |
| 2013/0041785 A1 | 2/2013 | Young |
| 2014/0045515 A1* | 2/2014 | Austin .................... H04W 4/04 455/456.1 |
| 2014/0344118 A1* | 11/2014 | Parpia .................. G06Q 10/087 705/28 |

OTHER PUBLICATIONS

Non-final Office Action, U.S. Appl. No. 14/505,901, dated Dec. 20, 2016.
RBM Technologies, Visual Merchandise Manager, Aug. 9, 2012.

* cited by examiner

*Primary Examiner* — Shay S Glass
(74) *Attorney, Agent, or Firm* — Marshall, Gerstein & Borun LLP; Randall G. Rueth

(57) ABSTRACT

A method for assigning a planogram to a new fixture on a floor plan includes receiving an indication of which planogram to relocate and an indication of a target fixture that the planogram will be relocated upon. The computer-implemented method further includes determining where on the target fixture the selected planogram will be place and causing databases storing assignment data to be updated to reflect the new location. Once the databases are updated to reflect the relocation, the contents of the database are analyzed by a display device running a store layout application to depict the relocated planogram on the target fixture.

8 Claims, 12 Drawing Sheets

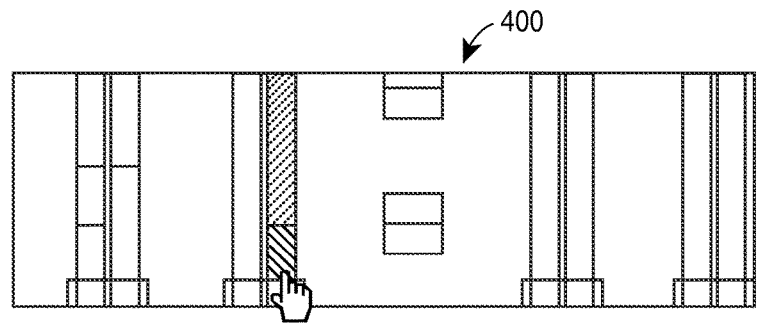
FIG. 4A
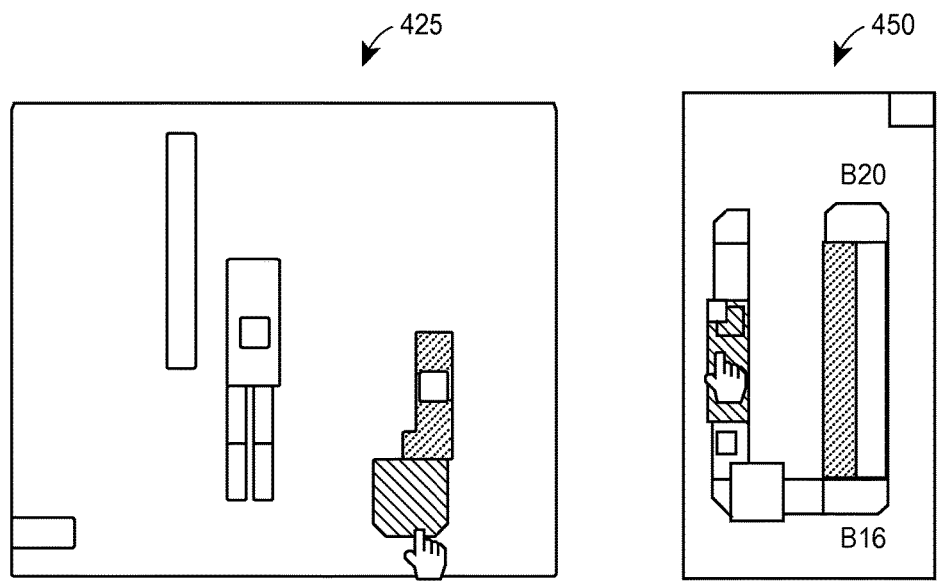
FIG. 4B  FIG. 4C

SYSTEMS AND METHODS FOR ASSIGNING A PLANOGRAM TO A FIXTURE CORRESPONDING TO A FLOOR PLAN

FIELD OF THE DISCLOSURE

This disclosure relates generally to arranging planograms on a floor plan, in particular, to assigning a selected planogram to a target fixture corresponding to a particular floor plan.

BACKGROUND DESCRIPTION

In order to maximize profits and improve the overall customer experience in a store, retailers often design floor plans that optimize the usage of available space. As part of this optimization, store layout and planning software may be used to manage where individual planograms (diagrams that specify where and in what quantity items should be placed) should be arranged in the store. In the past, store planning software required local installation, either via a program installed on a computer or a plugin downloaded from a website. However, these local solutions are unable to leverage information about the effectiveness of floor plans in other stores operated by the same retailer. Further, each store may implement systems on a plurality of different operating platforms, increasing costs on developing standardized tools for use by every store. Accordingly, there is a need to centralize the floor planning software in a way that is easily compatible with every store location in order to more accurately determine sales patterns or trends. For example, the retailer may be able to efficiently aggregate floor plan data across multiple stores to generate inputs into a floor space optimization program, such as the one described in pending provisional U.S. Patent Application No. 63/040,067, filed on Aug. 21, 2014, and entitled "FIXTURE-AWARE SYSTEM FOR AUTOMATICALLY ALLOCATING FLOOR SPACE," the entire disclosure of which is hereby incorporated by reference herein.

As part of the store layout and planning process, a retailer may develop new planograms that must be assigned a location within the store. Similarly, the retailer may create a requirement that an existing planogram is to be relocated to a new department within the store. The past systems would require the store or district manager download the new planogram to the local computer, save the changes locally, and subsequently upload the updated floor plan back to the centralized database. This time-consuming process prevents management from addressing the store's more pressing needs. Thus, there is an opportunity for a system that enables store managers to modify planograms assignments corresponding to a floor plan more efficiently by interacting with the floor plan data centralized server without the need for transferring large volumes of data across a communication network.

In another aspect, a manager may want to quickly know where any product or planogram in the store is located. To that end, the store layout application needs to be able to represent search results in a manner that quickly calls attention to the location of the desired assigned planograms. Similarly, in order to effectively manage a store's inventory, a store manager may also want to know how future scheduled product changes will impact or have impacted planograms located throughout the store. In other aspects, retailer may inquire if a store is complying with a product strategy based by ensuring all required planograms are assigned a location in a store. For all of these reasons, a centralized store layout application can allow quicker and more efficient control of a store's inventory and compliance with product strategy.

SUMMARY

In an embodiment, a method for assigning a planogram to a fixture associated with a floor plan is provided. The method, when executed by one or more computer processors particularly programmed to perform the method, comprises receiving, from a client device via a communication network, a first indication that a user has attempted to relocate a selected planogram and receiving, from the client device via the communication network, a second indication that the user has selected a target fixture corresponding to the floor plan to which the planogram will be assigned. The method further comprises determining, by the one or more computer processors, a location on the fixture that the planogram will be placed and updating, by the one or more computer processors, the floor plan to represent that the selected planogram has been assigned to the target fixture and placed at the determined location. The method still further comprises transmitting, to the client device via the communication network, data representative of the updated floor plan.

In another embodiment, a method for assigning a planogram to a fixture associated with a floor plan is provided. The method, when executed by one or more computer processors particularly programmed to perform the method, comprises displaying, by one or more processors, the floor plan in an interface that enables a user to view and modify the floor plan and transmitting, to a server via a communication network, a first indication of the user attempting to relocate a selected planogram. The method further comprises transmitting, to the server via the communication network, a second indication of the user selecting a target fixture corresponding to the floor plan to which the selected planogram will be assigned and receiving, from the server via the communication network, data representative of the updated floor plan. The method still further comprises displaying, by the one or more processors, the updated floor plan, wherein the updated floor plan depicts the selected planogram on the target fixture.

In still another embodiment, a computer device for assigning planograms on a floor plan is provided. The computer device comprises a communication module, one or more processors, and one or more non-transitory memories coupled to the one or more processors, wherein the one or more non-transitory memories include computer executable instructions stored therein that, when executed by the one or more processors, cause the one or more processors to receive, via the communication module, a first indication that a user has attempted to relocate a selected planogram and receive, via the communication module, a second indication that the user has selected a target fixture corresponding to the floor plan to which the planogram will be assigned. The one or more processors further execute instructions to determine a location on the fixture that the planogram will be placed and update the floor plan to represent that the selected planogram has been assigned to the target fixture and placed at the determined location. The one or more processors still further execute instructions to transmit, via the communication module, data representative of the updated floor plan.

In yet another embodiment, a computer device for displaying planograms on a floor plan is provided. The computer device comprises a communication module, one or more processors, and one or more non-transitory memories coupled to the one or more processors, wherein the one or more non-transitory memories include computer executable instructions stored therein that, when executed by the one or more processors, cause the one or more processors to display the floor plan in an interface that enables a user to view and modify the floor plan and transmit, via the communication module, a first indication of the user attempting to relocate a selected planogram. The one or more processors further execute instructions to transmit, via the communication module, a second indication of the user selecting a target fixture corresponding to the floor plan to which the selected planogram will be assigned and receive, via the communication module, data representative of the updated floor plan. The one or more processors still further execute instructions to display the updated floor plan, wherein the updated floor plan depicts the selected planogram on the target fixture.

BRIEF DESCRIPTION OF THE DRAWINGS

FIG. 4A illustrates an example interface for a planogram that has been assigned to a regular fixture that can be displayed on the client device of FIG. 1;

FIG. 4B illustrates an example interface for a planogram that has been assigned to an irregular fixture that can be displayed on the client device of FIG. 1;

FIG. 4C illustrates an example interface for a planogram that has been assigned to a counter that can be displayed on the client device of FIG. 1;

DETAILED DESCRIPTION OF THE EMBODIMENTS

Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

In embodiments described below, a store layout application operating on a centralized server provides functionality enabling a manager to assign planograms to fixtures corresponding to a floor plan, search for the location of a planogram or product within a store, and view planograms that are affected by product changes that occur within a desired time frame.

System Overview

Figure 1:
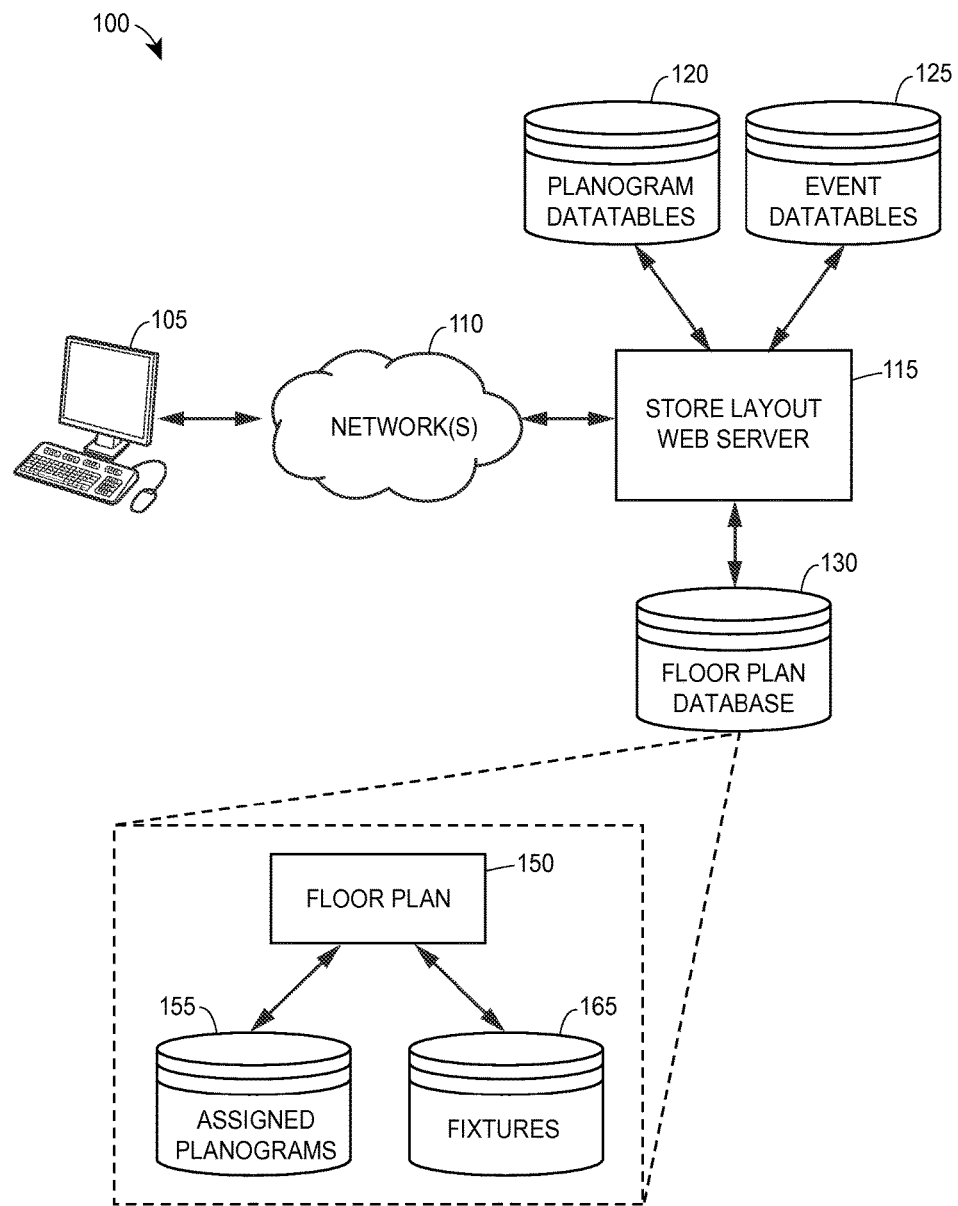
FIG. 1 illustrates an example store layout system that implements the techniques of the present disclosure to assign planograms on a floor plan, conduct a planogram search, and integrate an event calendar into a floor plan display.

Referring to FIG. 1, illustrated is an example environment 100 for the execution of the store layout application corresponding to a retailer. The environment 100 may include a client device 105 that interacts with a store layout web server 115 via one or more communication networks 110. The client device 105 may be a computer, a mobile phone, a tablet or any other electronic device capable of wireless communications. It should be appreciated that although only environment 100 only depicts the client device 105, other embodiments may include any number of client devices, for example, each store operated by the retailer may be contain its own dedicated client device(s). A user may operate the client device 105 to launch an internet browser application and navigate to a website that facilitates access to the store layout web server 115. In other embodiments, the user may operate client device 105 to launch a standalone app dedicated to interfacing with the store layout web server 115. The network 110 may be a local area network (LAN), a wide area network (WAN), or a mobile data network (e.g., LTE, EVDO, GSM and the like), for example. In some embodiments, the network 110 may further comprise a virtual private network (VPN) or other private network components to prevent users not affiliated with the retailer from accessing potentially confidential store layout information.

The store layout web server 115 may be interconnected with several databases and the data tables stored therein, for example, a planogram database 120, an event database 125, and a floor plan database 130. As used herein, "database" shall refer to both the database itself and the data tables stored within that database. Although FIG. 1 depicts planogram database 120, event database 125 and floor plan database 130, a single database may incorporate any combination of databases 120-130. In some embodiments, the store layout web server 115 may be implemented as multiple servers each able to perform some or all of the functionality of store layout web server 115 as described elsewhere herein. The planogram database 120 may store all planograms created by the retailer to be integrated into floor plans. Each planogram may also correspond to a set of properties that define the physical characteristics of the planogram (e.g., height, width, and the like), retailer strategy characteristics (e.g., whether the planogram is required for a particular set of stores), and a list of all products contained within the planogram. In some embodiments, the planograms inside the planogram database may be generated or modified by a planogram optimization routine, such as those described in pending U.S. patent application Ser. No. 12/773,617, filed on May 4, 2010, and entitled "Method and System for Optimizing Store Space and Item Layout," the entire disclosure of which is hereby incorporated by reference herein.

The event database 125 may store past and future events relating to planograms modifications. Each event in the event database may correspond to a list of products and/or planograms that have been modified and a date when the change has been implemented or is scheduled to be implemented. For example, when the planogram optimizer determines that a new planogram should be implemented by stores, there may be an event created on a future date in which stores are to implement the changes corresponding to the optimized planogram. Some planogram changes include adding a new product, removing a current product, changing the displayed quantity of a product, and changing the location of a product within the same planogram, for example.

The floor plan database 130 may store floor plans that correspond to individual stores operated by the retailer. Each individual floor plan 150 stored in the floor plan database 130 may correspond to a list of assigned planograms 155, and a list of fixtures located in the store 165. The list of assigned planograms may contain associations between a planogram in the planogram database 120 and a fixture in the list of fixtures 165 corresponding to floor plan 150. The store layout application may enable multiple planograms to be assigned to the same fixture. In some embodiments, there may be planograms in the planograms database 120 not contained in the list of assigned planograms 155 corresponding to floor plan 150. This may occur, for example, when the products contained in the planogram are region specific products and the floor plan 150 corresponds to a store outside of that region; or when the planogram is newly created and the store manager has not yet assigned a location to the planogram, for example.

According to some aspects, the store layout web server 115 executes instructions pertaining to accessing and modifying the floor plan 150 or any of the databases 120-130 and the client device 105 executes instructions pertaining to the display of the store plan and the gathering of user input. For example, with reference to FIG. 2, an example interface 200 corresponding to the store layout application is depicted. A client device (such as client device 105 as described with respect to FIG. 1) may present interface 200 to a user. The interface 200 may display a to-scale digital representation of the actual layout of an individual store, as well as interface elements that enable the user to, for example, search for products, adjust the view, receive help, and change the displayed floor plan. It should be appreciated that in some embodiments, elements depicted in interface 200 may be modified or missing or, alternatively, that elements not depicted in interface 200 may be depicted by the store layout application. For example, when the client device is a mobile phone, the displayed interface may be optimized for mobile phone usage rather than computer usage.

Figure 2:
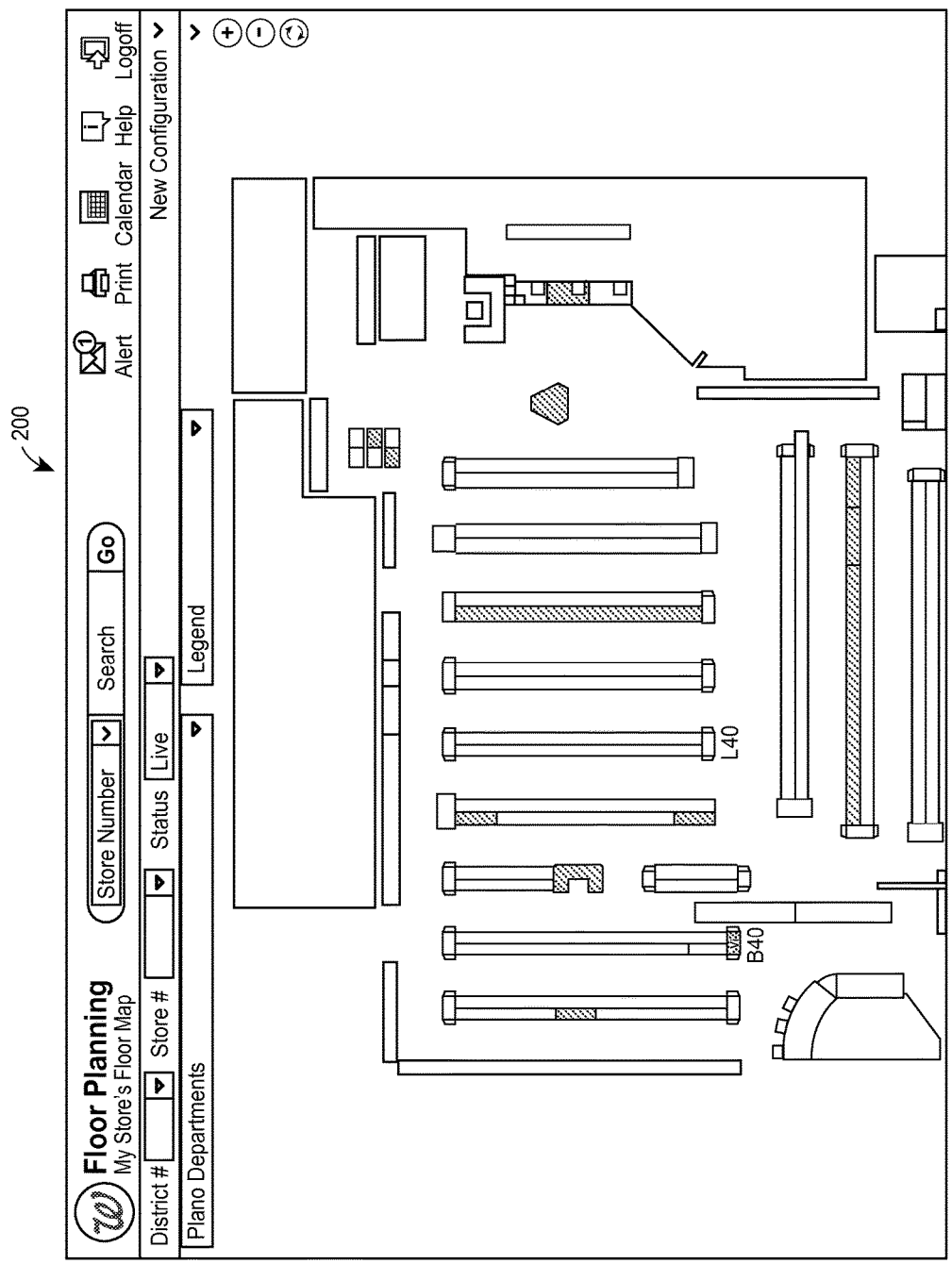
FIG. 2 illustrates an example interface for a store layout interface that can be displayed on the client device of FIG. 1.

As the user interacts with interface 200, the client device may gather indications of user interactions (e.g., mouse clicks or screen touches) and/or search parameters and transmit them to a server corresponding to the store layout application (such as store layout web server 115 as described with reference to FIG. 1). As used herein, the word "click" shall refer to any form of receiving user input indicating an interaction with a particular location on an interface (e.g., clicking a mouse or touching a screen). The transmission may consist of the coordinates of that the user clicked on the display or the string corresponding to the search parameters. In some cases, in response to receiving coordinates, the store layout web server may determine an appropriate response. For example, a click on a planogram may generate a menu of possible actions to interact with the planogram, and a click on a help icon may generate another interface or dialog box to assist the user in further interacting with the store layout application. It should be appreciated that interface 200 only depicts one embodiment and other embodiments may include additional, fewer, or modified features than as depicted in FIG. 2.

In regards to particular features of interface 200, the client device may display all fixtures corresponding to a floor plan. When a planogram has been assigned to a fixture, a representation of the planograms may be depicted on top of the space occupied by the fixture. This representation may include the name of the planogram and depicting the fixture space occupied by the planogram in a color representative of occupied fixture space. A different color may represent empty or available space on fixtures. For example, the space occupied by a planogram may be displayed in blue and empty space on a fixture may be displayed in tan. As depicted in interface 200, end stand B40 is occupied by a planogram, whereas end stand Y40 is empty. Accordingly, end stand B40 is displayed in a color representative of an occupied fixture and, although not depicted in FIG. 2, has a label to provide an indication of the name of the planogram assigned to stand B40. Conversely, end stand Y40 is displayed in a color representative of an empty fixture and there is no label indicative of an assigned planogram.

Additionally, interface 200 depicts an alert icon and a numerical indicator of the number of alerts. In response to the user clicking the alert icon, the client device may display a list of alerts based on the current floor plan. For example, a retailer may specify that a planogram must be assigned to a fixture for the store to be compliant with the current product strategy. If the required planogram is currently unassigned, an alert may be generated to inform the user the current floor plan is non-compliant. Accordingly, the non-compliance alert may no longer be displayed once the required planogram is assigned to a fixture.

Assignment of Planograms

Figure 3A:
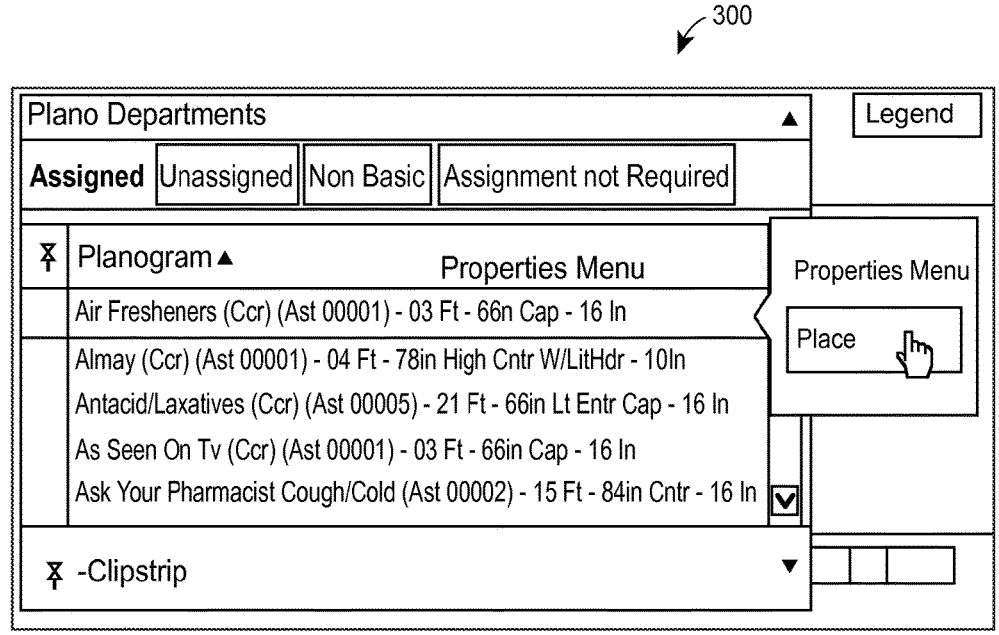
FIG. 3A illustrates an example interface for a list of assigned planograms that can be displayed on the client device of FIG. 1.

With reference to FIGS. 3A-5B, the process of assigning a planogram to a new or different fixture is described. Starting with interface 200, a user may seek to move an already assigned planogram to a different fixture corresponding to the displayed floor plan. FIG. 3A illustrates an exemplary interface 300 that may be generated in response to the user clicking the drop down menu labeled "plano departments" corresponding to interface 200. The interface 300 provides a scrollable list of planograms that have been assigned to fixtures corresponding to the current floor plan. Further, interface 300 also provides tabs that enable the user to view lists of other categories of planograms, for example, unassigned planograms (i.e., planograms the must be placed in order to meet the retailer's compliance directives), non-basic planograms (i.e., planograms managed by vendors and not the retailer), and planograms which do not need to be assigned (i.e., planograms that do not impact a store's compliance when not assigned). In response to the user clicking a tab, the store layout web server may generate a new scrollable list for planograms corresponding to the indicated category of planograms. For example, clicking on the unassigned tab label may cause the interface 300 to display a scrollable list of unassigned planograms that must be assigned for the store to be compliant with the product strategy.

Interface 300 also enables the user to click on any planogram in the scrollable list of planograms. In response, the store layout web server may generate a menu of actions corresponding to the selected planogram that the user can perform. As part of this menu, an option to "place" the planogram may be provided. When "place" is chosen, the client device may transmit to the store layout web server an indication that the user is attempting to move the selected planogram to a new location. Additionally, in order to indicate that the user is attempting to relocate the selected planogram, according to some embodiments, a "+" may be displayed next to the entry in the scrollable list corresponding to the selected planogram.

Figure 3B:
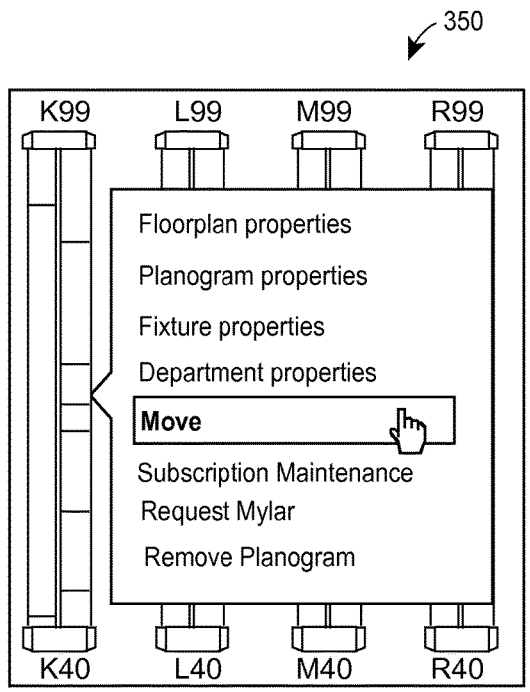
FIG. 3B illustrates an example interface for a menu of actions corresponding to an assigned planogram that can be displayed on the client device of FIG. 1.

FIG. 3B illustrates an exemplary interface 350 for performing an action with an assigned planogram. The interface 350 may be displayed in response the user clicking on a planogram already assigned to a fixture while interacting with interface 200. The interface 350 provides a menu of possible actions to interact with the selected planogram. Additionally, the interface 350 may depict the selected planogram in a color distinct from the color normally representative of an assigned planogram. For example, the selected planogram may be depicted in green, whereas the normal color to depict an assigned planogram may be blue. In such cases, when the user clicks in a part of interface 350 other than the selected planogram or a menu selection, the interface 350 may return to depicting the planogram in the color normally representative of assigned planograms. Similar to the user selecting "place" with respect to interface 300, when the user selects "move" the client device may transmit to the store layout web server an indication that the user is attempting to move the selected planogram.

FIGS. 4A-4C illustrate exemplary interfaces 400-450, respectively, for a user selecting different types of fixtures as a target to assign a selected planogram. It should be appreciated that in each of the interfaces 400-450, the user has already clicked target fixture to assign the selected planogram. In each of the interfaces 400-450, the relocated planogram may still be depicted in the color representative of selected planograms as described with respect to FIG. 3B.

The interface 400 depicts the user placing or moving the selected planogram onto a regular fixture. The amount of space the relocated planogram occupies on the regular fixture is determined by the actual size of the planogram as described in the planogram properties.

The interface 425 depicts the user placing or moving the selected planogram onto an irregular fixture. After relocating to the irregular fixture, the planogram may be resized to fill the space occupied by the irregular fixture. Similarly, in scenarios in which the user relocates the planogram to an end stand, side panel or dump table, the planogram may be resized to take the shape of the respective end stand, side panel, or dump table.

The interface 450 depicts the user placing or moving the selected planogram onto a counter. After relocating to the counter, the planogram is resized to fill an area representative of one square foot. After placing or moving the planogram on the counter, both the space representative of the counter and the space representative of the planogram may be depicted in the color corresponding to selected planograms.

Figures 5A, 5B:
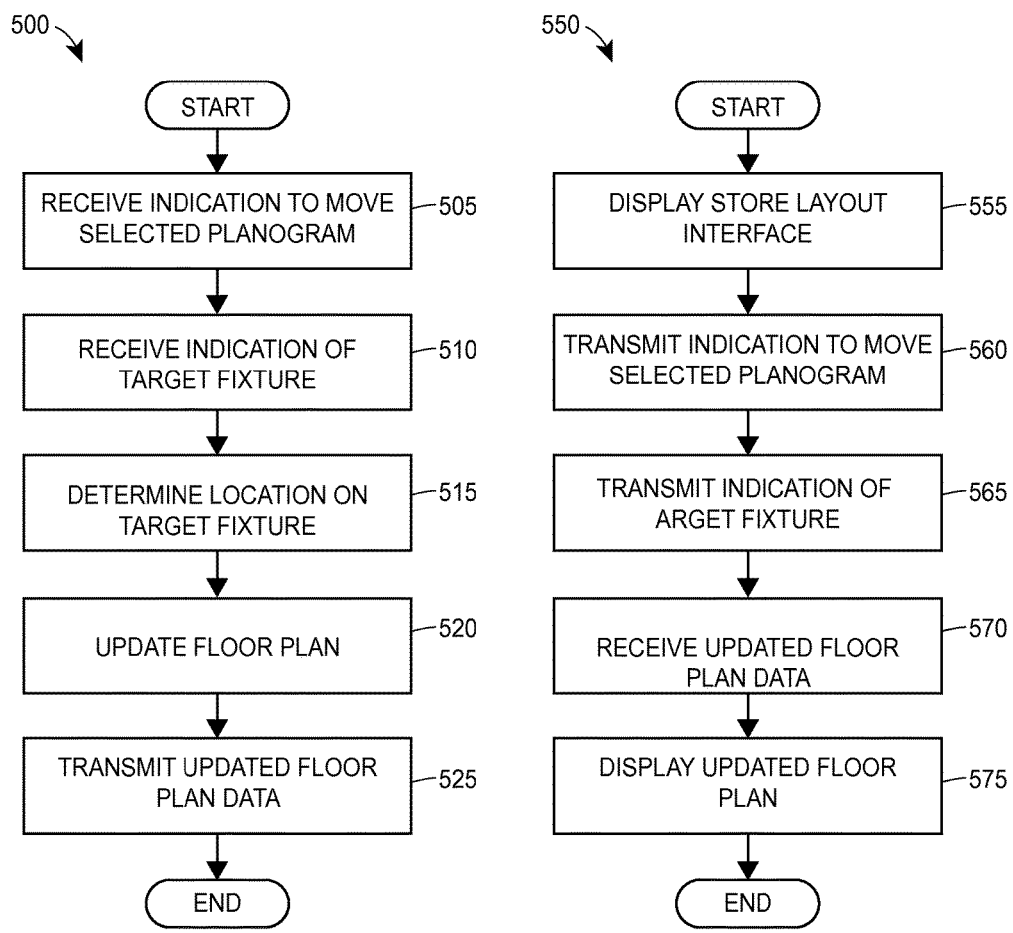
FIG. 5A is a flow diagram of an example method for assigning a planogram to a target fixture that can be implemented in the store layout web server in FIG. 1.
FIG. 5B is a flow diagram of an example method for assigning a planogram to a target fixture that can be implemented in the client device in FIG. 1.

FIG. 5A illustrates a flow diagram of an example method 500 for relocating a planogram on a floor plan. The method 500 may be implemented by a store layout web server, such as the store layout web server 115 described with respect to FIG. 1.

To begin, the store layout web server may receive from a client device an indication that a user is attempting to move or relocate a selected planogram to a different fixture corresponding to the floor plan (block 505). Similarly, the store layout web server may alternatively receive an indication that a user is attempting to assign a currently unassigned planogram. The indication may include an identification of the selected planogram and an indication that the user is attempting to move the selected planogram. For example, the received indication may identify that the name of the selected planogram is "laundry detergent" and a flag or other type of parameter indicating that the user is attempting to move or assign the laundry detergent planogram.

The store layout web server may then receive from the client device an indication of a target fixture to which the user is attempting to assign the selected planogram (block 510). The indication may include an identification of the target fixture and the coordinates corresponding to a location on the interface that the user has clicked. The identification, for example, may indicate that the target fixture is named "K40." The coordinates, for example, may be represented as a pair of numbers indicating an X-coordinate and a Y-coordinate (e.g., <15.2, 17.9>).

After receiving identifications of the selected planogram and the target fixture from the client device, the store layout web server may attempt to determine a location on the target fixture that the planogram will be assigned (block 515). To this end, the store layout web server may query a fixture database corresponding to the floor plan. The query may use the identified name of the target fixture to look up the associated fixture in a fixture database (such as database 165 as described with respect to FIG. 1). Once the fixture in the database is discovered, the store layout web server may analyze the properties of the target fixture to determine whether the user clicked a location on the target fixture already occupied by another planogram. If the coordinates are correspond to empty space on the fixture, the selected planogram may be placed on the target fixture centered, or otherwise situated, at the click location.

Conversely, when the user clicked a location already occupied by another planogram, further processing is required to determine the location the location the selected planogram will be assigned. When the target fixture is any of a regular fixture, an end stand, a dump table, or a side panel, the store layout web server may compare the received coordinates to the properties of the already assigned planogram to determine if the user clicked the planogram on the left or right side of the assigned planogram. When the coordinates indicate the user clicked on the left half of the assigned planogram, the selected planogram may be assigned to the immediate left of the assigned planogram. Similarly, when the coordinates indicate that the user clicked on the right half of the assigned planogram, the selected planogram may be assigned to the immediate right of the assigned planogram. It should be appreciated that in some embodiments, any number of planograms may occupy the space to the immediate left or right of the already assigned planogram. In such a scenario, the selected planogram may be assigned to the first available space to the left or right of the already assigned planogram.

It should be appreciated that in some cases, the location of the planogram to the left or right of the already assigned planogram may result in the selected planogram being placed beyond the confines of the target fixture. In some embodiments, the store layout application may permit such assignments from occurring because scenarios exist where such assignments are valid. For example, the manager may require that an already assigned planogram is resized to accommodate the selected planogram. In this case, the store manager may assign both the planogram that will be resized and the selected planogram to the target fixture. While the manager waits to for the resized planogram to appear in a planogram database, the space occupied by both the planogram that will be resized and the selected planogram may exceed the physical confines of the target fixture. Once the resized planogram is finalized and added to the database of planograms, the store manager may then replace the originally sized planogram with the resized planogram, resulting in the space occupied by both planograms fitting within the confines of the target fixture.

According to some embodiments, when the target fixture is an irregular fixture, the store layout web server may resize both the already assigned planogram and the selected planogram to the size of one square foot. Subsequently, both planograms may be assigned adjacent positions on the irregular fixture. Similarly, when the target fixture is a counter, the store layout web server may resize the selected planogram to the size of one square foot. The selected planogram may then be assigned a location adjacent to the already assigned planogram.

Once the location on the target fixture that the planogram will be assigned is determined, the store layout web server may update the floor plan to reflect the assignment of the selected planogram to the target fixture (block 520). If the selected planogram was previously unassigned to a fixture corresponding to the floor plan, then an entry in an assigned planogram database may be created for the selected planogram. The entry may include the name of the planogram, the name of the fixture, and the location of the planogram on the fixture. In such cases, an entry corresponding to the previously unassigned planogram may be deleted from a database of unassigned planograms. When the selected planogram was previously assigned to a fixture corresponding to the floor plan, the entry in the assigned planograms database may be updated to reflect the new fixture name and location on the new fixture. In addition to updating the assigned planogram database, the entry corresponding to the target fixture in the fixture database may also be updated to reflect the assignment of the selected planogram.

The store layout web server may then transmit the updated floor plan data to the client device for display (block 525). The transmission may include the contents of the fixture database and the assigned planograms database corresponding to the floor plan. The contents of these databases may provide indications about the size and location of each fixture located on the floor plan and the size and location of each assigned planogram located on its respective assigned fixture. For example, an entry in the fixture database may indicate that a fixture is 3 feet by 15 feet and located 10 feet from the west edge of the floor plan and 20 feet from the north edge of the floor plan. Similarly, an entry in the assigned planogram database may indicate that a planogram is 3 feet wide and located 2 feet from the south edge of a fixture. It is envisioned that any method of storing locations on a floor plan for a fixture or planogram in a database may be implemented by envisioned embodiments.

FIG. 5B illustrates a flow diagram of an example method 550 for relocating a planogram on a floor plan. The method 550 may be implemented by a client device, such as the client device 105 described with respect to FIG. 1.

To begin, the client device may display a store layout interface that enables a user to interact with a floor plan (block 555). The displayed interface may comprise interface 200 as described with respect to FIG. 2. In order to display the interface, the client device may receive, from a remote server, the contents of a fixture database and an assigned planogram database corresponding to the active floor plan. The client device may analyze the contents of the fixture database and the assigned planogram database to determine the dimensions and the location on the floor plan corresponding to each fixture and assigned planogram. Based on the current view of the floor plan (i.e., information pertaining the zoom and location of the current view), the client device may display a to-scale representation of fixtures and assigned planograms corresponding to the floor plan. According to some aspects, the part of each fixture corresponding to an assigned planogram may be depicted in a first color, and the parts of each fixture that are empty may be depicted in a second color. Similarly, parts of the floor plan not corresponding to a fixture may be depicted in a third color.

The displayed interface may enable the user to begin relocating an assigned planogram by enabling the user to click any displayed assigned planogram or to click a "plano departments" drop down menu and, subsequently, click a planogram contained in any list of planograms. In response, the client device may display a second interface on top of the first interface, such as interface 350 as described with respect to FIG. 3B or interface 300 as described with respect to FIG. 3A.

When the user clicks a "place" or "move" menu option corresponding to the second interface, the client device may transmit to the remote server an indication that the user is attempting to relocate or assign the currently selected planogram (block 560). The indication may include the name of the selected planogram or an identification number. For example, the name of the selected planogram may be "kitchen" and a string containing "kitchen" may be included in the indication. Similarly, the kitchen planogram may be identified as planogram A123456 and the identification code A123456 may be included in the in the indication. The indication may further include a flag or other parameter that indicates that the user is actively trying to relocate or assign the selected planogram. In addition to transmitting the indication, the client device may depict the selected planogram in a color representative of an actively selected planogram (e.g., green).

The client device may then provide an interface that enables the user to click on a target fixture that the selected planogram will be located upon. If the user clicks part of the floor plan not corresponding to any fixture, the cursor may indicate that the user has clicked an invalid destination for the selected planogram (e.g., by displaying a crossed circle). Further, if the user clicks the already selected planogram a second time, an interface may be provided that enables the user to cancel the relocation of the selected planogram.

When the user clicks the interface in a location corresponding to a fixture, the client device may transmit to the remote server an indication that the user is attempting to relocate or assign the selected planogram onto the target fixture (block 565). This indication may include an identification or name of the target fixture and coordinates indicative of a location that the user has clicked. In some embodiments, the coordinates may be determined by calculating the distance the user clicked from the left edge of the floor plan and the upper edge of the floor plan to determine an X-coordinate and a Y-coordinate, respectively.

After the remote server updates the floor plan to reflect the planogram relocation, the client device may receive from the remote server updated floor plan data that represents the selected planogram has been assigned to the target fixture (block 570). The updated floor plan data may comprise the contents of the fixture database and assigned planograms database corresponding to the current floor plan. The client device may then interpret the updated floor plan data to display the floor plan to the user (block 575). In particular, the client device may interpret the updated floor plan data to display the selected planogram on the target fixture by performing similar actions as performed when displaying the initial interface (block 555).

Planogram Search

Figure 6:
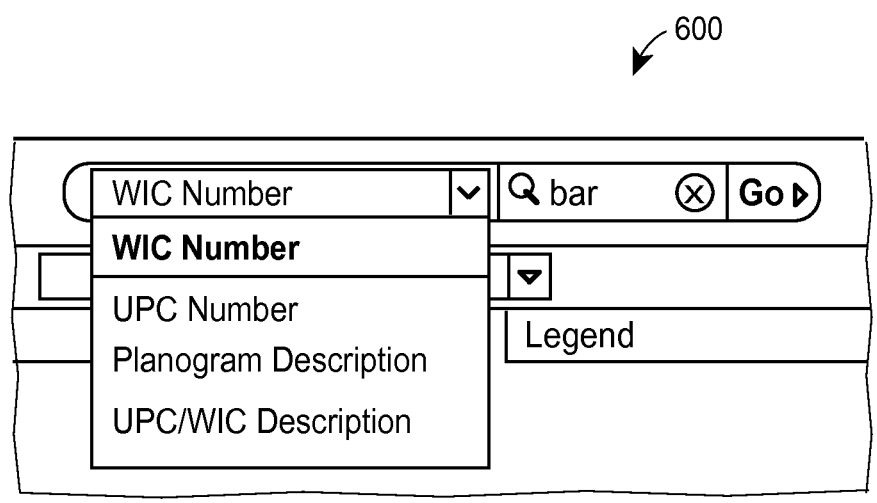
FIG. 6 illustrates an example interface for a search type drop down menu that can be displayed on the client device of FIG. 1.

With reference to FIGS. 6-8B, the process for a user to search a floor plan for a product or planogram is described. FIG. 6 illustrates an interface 600 containing a drop down menu enabling the user to select a type of search to conduct. Interface 600 may be displayed in response to the user clicking the drop down arrow next to the search box on interface 200 as depicted in FIG. 2. The displayed drop down menu may list types of searches supported by the store layout application. For example, the interface 600 may display options to conduct product searches based on the retailer's inventory codes ("WIC Number"), universal product code ("UPC Number"), or words in the description of an individual product ("UPC/WIC Description"). Additionally, the interface 600 may display an option to conduct a search based on the description of a planogram ("Planogram Description"). It should be appreciated that search types other than the types depicted in FIG. 6 are envisioned.

Figure 7:
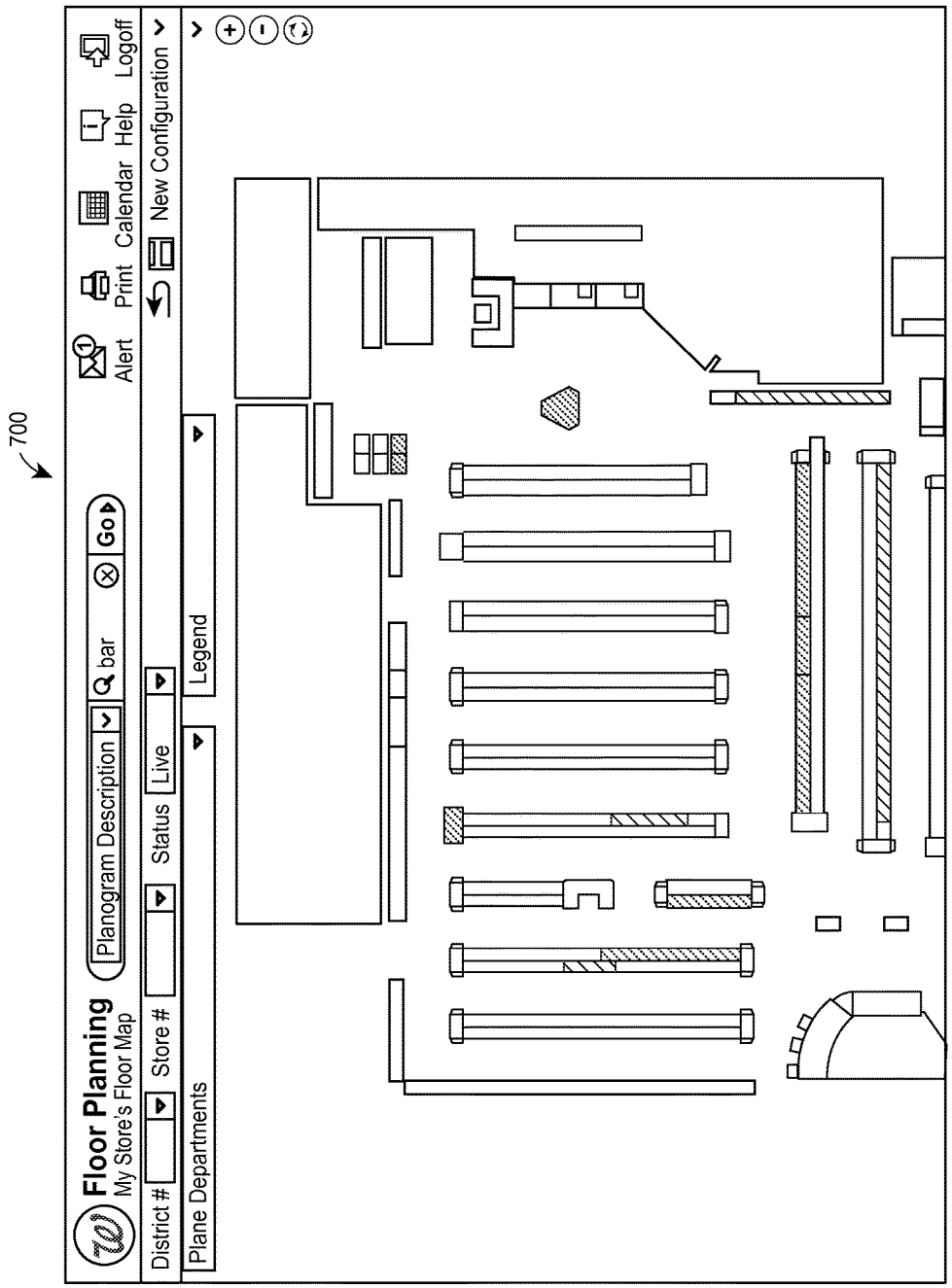
FIG. 7 illustrates an example interface for displaying search results that can be displayed on the client device of FIG. 1.

Turning to FIG. 7, illustrated is an interface 700 depicting the results of a planogram description search. Interface 700 may be displayed after the user enters a search parameter into the search field and then clicks the "Go" button while interacting with interface 200 as described with respect to FIG. 2. The search type ("Planogram Description") and search parameter ("bar") may be displayed on interface 700 above the floor plan. On the floor plan, all assigned planograms containing the search parameter in the description are displayed in a first color (e.g., green) and the assigned planograms that do not contain the search parameter in the description are displayed in a second color (e.g., blue).

Figures 8A, 8B:
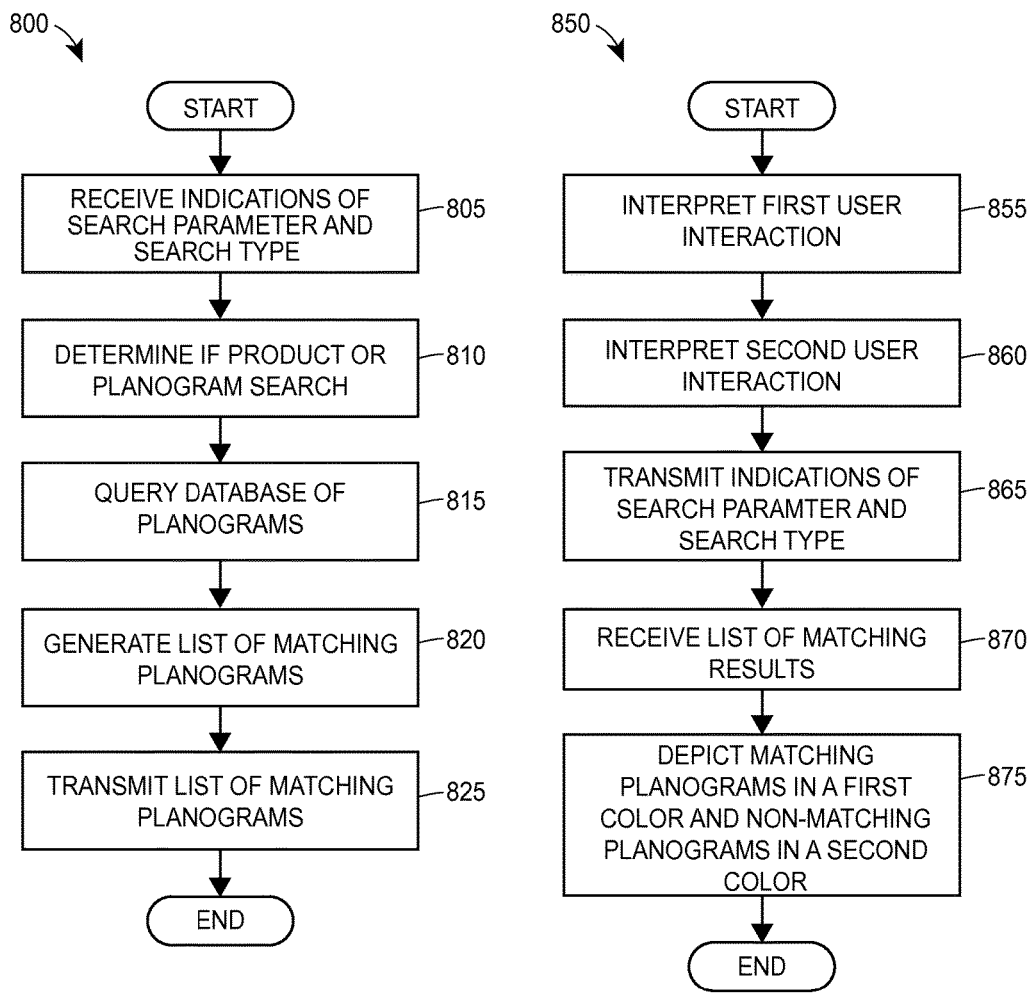
FIG. 8A is a flow diagram of an example method for determining search results that can be implemented in the store layout web server in FIG. 1.
FIG. 8B is a flow diagram of an example method for displaying search results that can be implemented in the client device in FIG. 1.

FIG. 8A illustrates a flow diagram of an example method 800 for determining the results of a planogram or product search. The method 800 may be implemented by a store layout web server, such as the store layout web server 115 described with respect to FIG. 1.

To begin, the store layout web server may receive from a client device an indication of a search parameter and a search type (block 805). The indication of the search parameter may comprise a string of letters or numbers that the user is searching for. For example, in some scenarios, the search parameter may represent a desired word in planogram description (e.g., "bar") or a set of numbers corresponding to a UPC code company prefix (e.g., "456789"). The indication of search type may indicate a particular property corresponding to a planogram or product that will be searched. In some embodiments, the indication of search type may comprise a string corresponding to the type of search (e.g., "Planogram Description") or a number indicative of a type of search. As an example, a retailer may maintain a table of supported search types and the search type number may be used to query the table to determine the corresponding type of search. In such an example, the table may indicate that a search type number of "1" corresponds to an inventory code number search. Accordingly, receiving a search number of "1" indicates that the user attempting an inventory code search.

The store layout web server may then determine if the search type indicates that the user is searching for a product or a planogram (block 810). Each type of search supported by the store layout application may correspond to an indication to whether the search is for a product or for a planogram. For example, in some embodiments, a retailer may support searches for UPC numbers, inventory code numbers, product descriptions and planogram descriptions. Accordingly, searches for UPC numbers, inventory code numbers and product descriptions may correspond to a product search and searches for planogram descriptions may correspond to a planogram search. It should be appreciated that any type of search based on planogram or product properties are envisioned.

Once it is determined whether the search is for a planogram or a product, the store layout web server may then query a database of assigned planograms corresponding to the floor plan (block 815). When the search is for a planogram, the store layout web server may compare the search parameter to the indicated planogram property for each planogram in the assigned planograms database. For example, in scenarios when the search type is a planogram description search, the store layout web server may compare the search parameter and the planogram description. If the search parameter matches the planogram description or a subset of the planogram description, then the planogram meets the search criteria. As an example, when the search parameter is "bar," planograms containing the words "bar" or "barbeque" in the planogram description will meet the search criteria.

On the other hand, when the search is determined to be a product search, the store layout web server may further query databases of products corresponding to each assigned planogram in the assigned planograms database. Similar to the planogram search, a product search compares the search parameter to the indicated property of each product in each product database. As an example, a planogram named "kitchen" may contain a database of products contained within the planogram that includes pots, pans, and other kitchen-related products. Each kitchen-related product may correspond to a description, an UPC number and an inventory code. Accordingly, during a product search for an inventory code of "1234", when the store layout web server queries the kitchen planogram, the store layout web server further queries the product database to compare the search parameter to the inventory code corresponding to each kitchen-related item. If the search parameter matches the inventory code or a subset of the inventory code corresponding to a product, both the product and the planogram containing the product meet the search criteria. Returning to the inventory code search for "1234", if the inventory code for a pot is "12345" and the inventory code for a pan is "34567," both the kitchen planogram and the pots product meet the search criteria.

The store layout web server may then generate or compile a list of matching planograms that meet the search criteria (block 820). In embodiments when the search is a product search, the store layout web server may additionally generate or compile a list of matching products that meet the search criteria. The lists may comprise all planograms and products that the store layout web server determined to have met the search criteria when querying the database of assigned planograms corresponding to the floor plan. For example, in the above inventory code search example, the kitchen planogram may be added to a list of matching planograms and the pots may be added to a list of matching products. For some product searches, a planogram may correspond to two products meeting the search criteria. In that scenario, the planogram may only be added to the list of matching planograms once. Of course, there may also be scenarios when there are no matching planograms or products. In such scenarios, the lists may be empty or null. The store layout web server may then transmit the list of matching planograms and, in scenarios that the user conducted a product search, the list of matching products to the client device (block 825).

FIG. 8B illustrates a flow diagram of an example method 850 for displaying the results of a planogram search. The method 850 may be implemented by a client device, such as the client device 105 described with respect to FIG. 1.

To begin, the client device may display an interface (such as interface 200 as described with respect to FIG. 2). The client device may monitor user interactions with the interface to determine that a user is attempting to conduct a search. The client device may then interpret these interaction to determine the details of the search the user is attempting to perform. A first interaction may comprise the user selecting a type of search from a drop down menu of search types (block 855). In one embodiment, when the user clicks an icon on the interface to view available options corresponding to the drop down box, the client device may display a list of search types supported by the store layout application. When the user subsequently clicks a particular entry in the drop down list, the client device may interpret that user interaction as the user indicating a search type. For example, if the user clicked on "Planogram Description" from the drop down list, the client device may interpret the interaction as indicative of the user about to conduct a search based on planogram description.

A second interaction may comprise the user entering text into a search box (block 860). The interface may provide the search box proximate to the drop down menu of search types. The search box may enable the user to enter text representative of the a term or number the user is searching for. The client device may interpret any text entered into the search box as the search parameter that a remote server will compare to the planogram or product parameter indicated by the search type. The interface may further provide a "search" or "go" button next to the search box that enables the user to indicate that the search is ready to be performed.

In response to the user clicking the "go" button, the client device may transmit to the remote server indications of a search type and a search parameter (block 865). The indication of the search type may be a string or number generated based on the entry the user selected in the drop down menu during the first interaction. The indication of the search parameter may be generated by copying the text that the user entered into the search box during the second interaction.

In response, the client device may receive a list of matching results from the remote server (block 870). The list may comprise all planograms that matched the search parameter or all planograms that contain a product that matches the search parameter. If the search type indicated a product search, the client device may further receive a list of each product matching the search parameter.

The client device may then depict planograms in the list of matching planograms in a first color and planograms that not in the list of matching planograms in a second color (block 875). In some embodiments, depicting the non-matching planograms in the second color may occur by continuing to display the non-matching planograms in the default color representative of assigned planograms. In order to depict the matching planograms in the first color, the client device may analyze a database of assigned planograms to determine the location on the interface that the planogram is assigned, as described elsewhere herein.

When displaying the results for a product search, the client device may also display an interface listing all matching products. The list may include columns for displaying each matching product's UPC number, inventory code number, and description. In some embodiments, the interface may include the ability to sort, in both ascending and descending order, the list based on each product's UPC number or inventory code number. Further, when the user clicks the interface on a particular listed product, the planogram corresponding to the product may begin to "blink" or otherwise call attention to the corresponding planogram.

Event Calendar

With reference to FIGS. 9-11B, the integration of an event calendar into the store layout application is described. The event calendar may list events related to planogram changes corresponding to a floor plan. For example, the retailer may want to increase the amount of shelf space assigned to a profitable product. The planogram containing the profitable product may be revised to increase the shelf space reserved for the profitable product. The retailer may then schedule a date that the changes are to be implemented in the store. The store layout application may then create an event in an event database where the event contains data corresponding to the scheduled change date and revised planogram. The event may remain in the event database even after it occurs to maintain a record of all changes to planograms corresponding to the floor plan.

In some embodiments, when a newer version of a planogram is scheduled to be implemented, that planogram may also correspond to a list of instructions detailing how to execute the changes. For example, the revisions to the planogram may add a new product to the planogram, remove a current product from the planogram, move the location of a product within the planogram, change the quantity of a product displayed by the planogram, and change the inventory code number or UPC number corresponding to a product contained within the planogram. The list of instructions may be organized and sorted by the UPC or inventory code assigned to a product, the action to be performed to a product, or by the position within the planogram.

Figure 9:
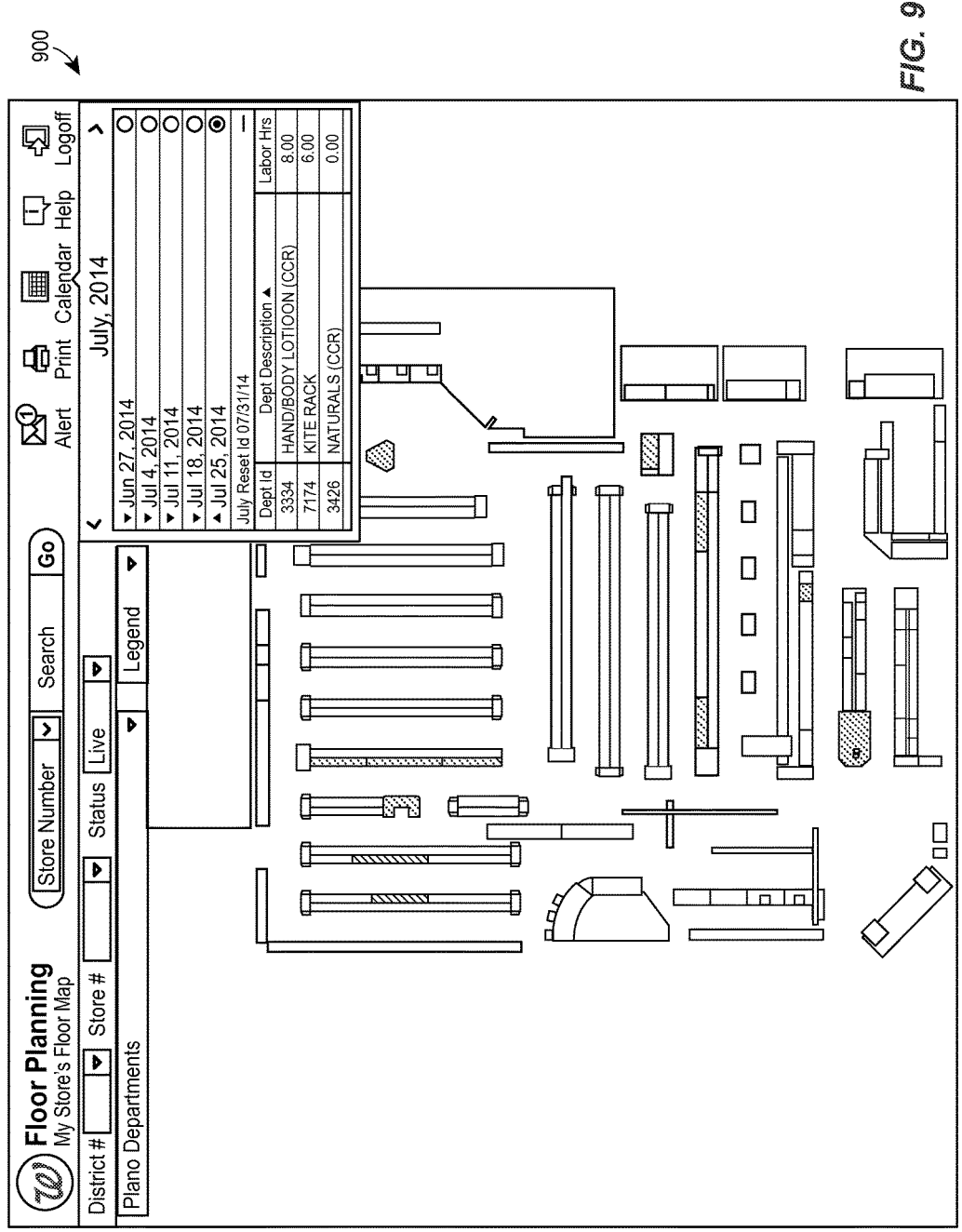
FIG. 9 illustrates an example interface for displaying planograms that are affected by events within a given week that can be displayed on the client device of FIG. 1.

Turning to FIG. 9, illustrated is an interface 900 depicting all events stored in an event database for a particular week. The interface 900 may be displayed after the user clicks the "calendar" icon while interacting with interface 200 as described with respect to FIG. 2. In particular, the assigned planograms on the floor plan corresponding to planograms in the list of planograms affected by the event are displayed in a color distinct from the color that assigned planograms not in the list of planograms affected by the event are displayed. Further, the interface 900 may depict a list of planograms affected by the event, including the planogram name (e.g., "Kite Rack") as well as an amount of labor to implement the changes to the planogram (e.g., "6.00"). In some embodiments, planograms that are affected by the event and managed by a vendor may display the amount of labor in a different color to indicate that the labor will be performed by the vendor instead of the retailer.

Figure 10:
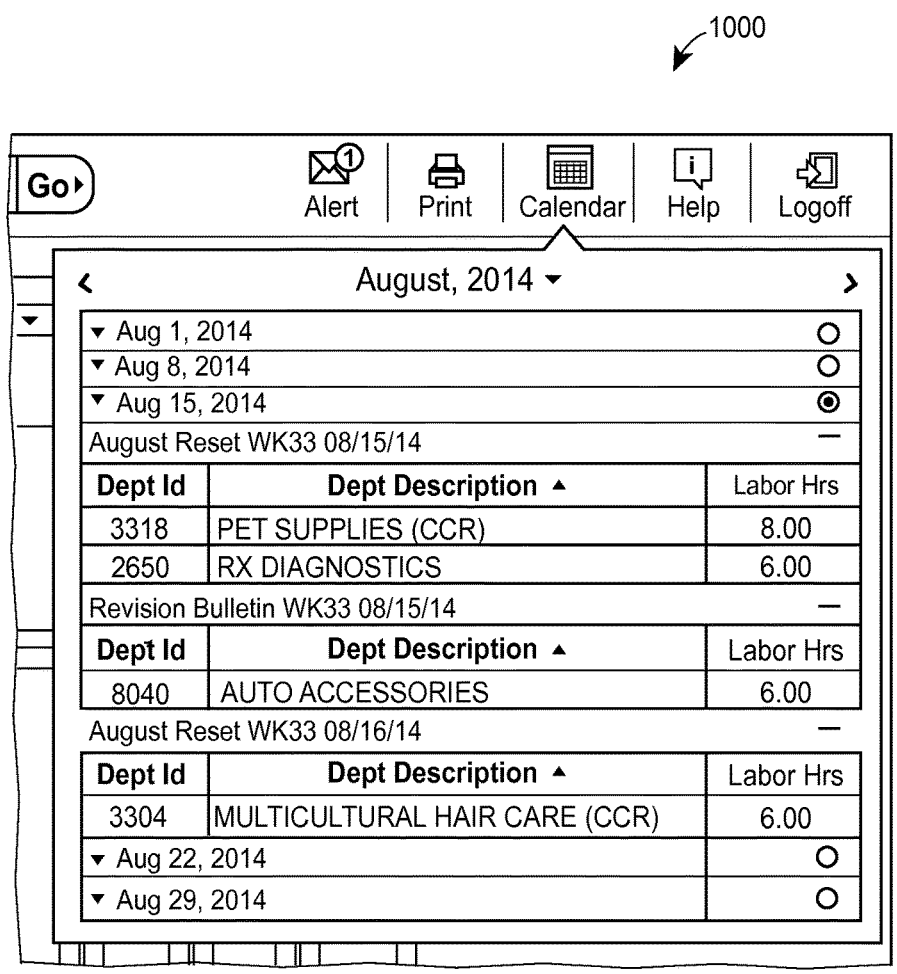
FIG. 10 illustrates an example interface for displaying a list of planograms that are affected by events within a given week that can be displayed on the client device of FIG. 1.

With respect to FIG. 10, illustrated is an interface 1000 depicting a display of a planograms affected by an event corresponding to a floor plan. The interface 1000 may be displayed when the user interacting with interface 900 changes the desired event time frame. For example, according to embodiments, the user may change the month by clicking on the month ("August, 2014") or on the arrow on either side of the month. The user may further indicate which week within the selected month to display by clicking on the line item indicating the week (e.g., "Aug. 15, 2014"). In response to the selection of the desired week, the interface 900 may display a list of all events that occurred within the desired week (e.g., "August Reset Wk 33 8/15/14").

Figures 11A, 11B:
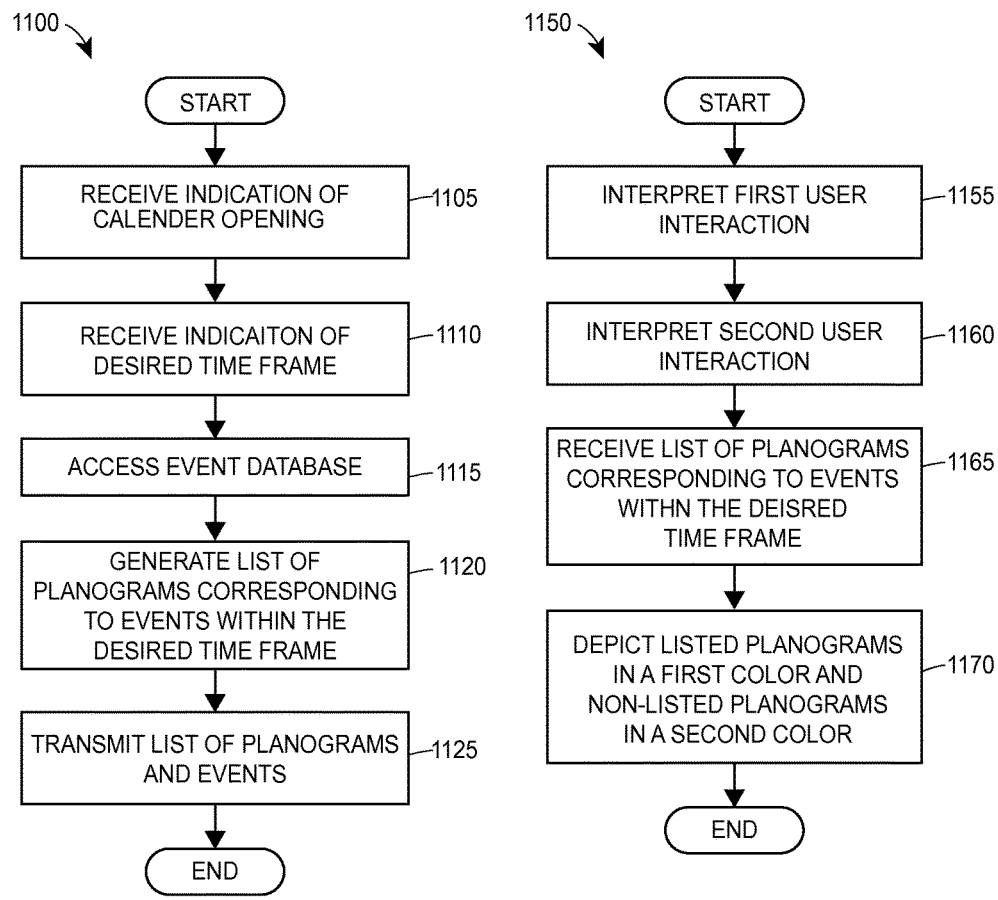
FIG. 11A is a flow diagram of an example method for determining which planograms are affected by an event that can be implemented in the store layout web server in FIG. 1.
FIG. 11B is a flow diagram of an example method for displaying planograms that are affected by an event that can be implemented in the client device in FIG. 1.

FIG. 11A illustrates a flow diagram of an example method 1100 for accessing events located in an event database. The method 1100 may be implemented by a store layout web server, such as the store layout web server 115 described with respect to FIG. 1.

To begin, the store layout web server may receive an indication of a user opening an event calendar in a store layout application displayed on a client device (block 1105). For example, the first indication may inform the store layout web server that the user has clicked on a calendar icon. In response, the store layout web server may access the event database to retrieve all events scheduled during the current week. The store layout web server may then transmit a list of events for the current week back to the client device to be displayed.

The store layout web server may then receive a second indication of a user indicating a desired time frame of events to view (block 1110). The second indication may include an indication of a particular time frame of events to display. In some cases the second indication may include a desired week of events (e.g., Jul. 25, 2014). In other cases, the second indication may include a desired month of events (e.g., July, 2014).

After receiving the second indication, the store layout web server may access the event database to retrieve a list of events corresponding to the time frame indicated in the second indication (block 1115). In cases where the second indication is for a particular week, each event scheduled for the indicated week is retrieved from the event database. In cases where the second indication is for a particular month, each event scheduled for the final week in the indicated month may be retrieved from the event database. In such cases, the store layout web server may additionally retrieve events that occurred in each of the other weeks within the indicated month to enable faster processing if the user subsequently indicates a desire to view events for a different week in the indicated month.

According to embodiments, the store layout web server may analyze the retrieved events to generate a list of all planograms affected by events within the indicated week (block 1120). Each retrieved event may include a list of planograms effected by the event and an amount of labor required to implement the changes corresponding to the event. The store layout web server may analyze these individual lists to compile a list comprising all of the planograms affected by each retrieved event scheduled for the indicated week. After compiling the list of planograms, the store layout web server may transmit the list of planograms and a list of the retrieved events to the client device to be displayed (block 1125).

FIG. 11B illustrates a flow diagram of an example method 1150 for displaying planograms affected by an event. The method 1150 may be implemented by a client device, such as the client device 105 described with respect to FIG. 1.

To begin, the client device may display an interface (such as interface 200 as described with respect to FIG. 2). The client device may monitor user interactions with the interface to determine that a user is attempting to interact with an event calendar. For example, the client device may interpret a first user interaction indicative of the user attempting to open an event calendar interface (block 1155). In particular, the interface may provide a "calendar" icon that enables the user to view an event calendar interface when selected. After detecting that the user has clicked the event calendar icon, the client device may transmit an indication to a remote server that the user is attempting to open the event calendar.

In response, the client device may receive a list of events scheduled during the current week and present them in an interface such as interface 1000 as described with respect to FIG. 10. The client device may then interpret an interaction with the newly displayed interface to select a desired week or month of events to view (block 1160). In some cases, the interaction may comprise the user clicking a label or radio button indicative of a particular week in the current month. In other cases the user may click a label indicative of a selection of a particular month. For example, the second interaction may comprise the user clicking the "August, 2014" label depicted in interface 1000. This interaction may generate another interface that enables the user to select a particular month and year. Similarly, the second interaction may comprise the user clicking the arrow to the left or right of "August, 2014" to indicating that the user seeks to view events corresponding to the previous and subsequent month, respectively. The client device may then transmit to the remote server an indication of the week or month of events the user is attempting to view.

After transmitting the indication of the desired time frame of events, the client device may receive a list of events scheduled within the desired time frame and a list of planograms effected by the listed events (block 1165). The client device may display the list of events scheduled within the desired time frame in an interface similar to the interface depicting the events scheduled during the current week. In some embodiments, some planograms in the list of planograms affected by the event may be managed by a vendor instead of the retailer. As described with respect to FIG. 9, the amount of labor may be depicted in a color that alerts the user that a vendor-managed planogram is listed.

In addition to displaying the list of events, the client device may depict assigned planograms affected by events scheduled within the desired time frame in a first color and assigned planograms not affected by the events scheduled within the desired time frame in a second color. In order to depict the affected planograms in the first color, the client device may analyze a database of assigned planograms to determine the location on the interface that the planogram is assigned, as described elsewhere herein. The client device may then depict the space corresponding to affected planograms in the first color and the unaffected planograms in the second color.

Hardware Description

Figures 12A, 12B:
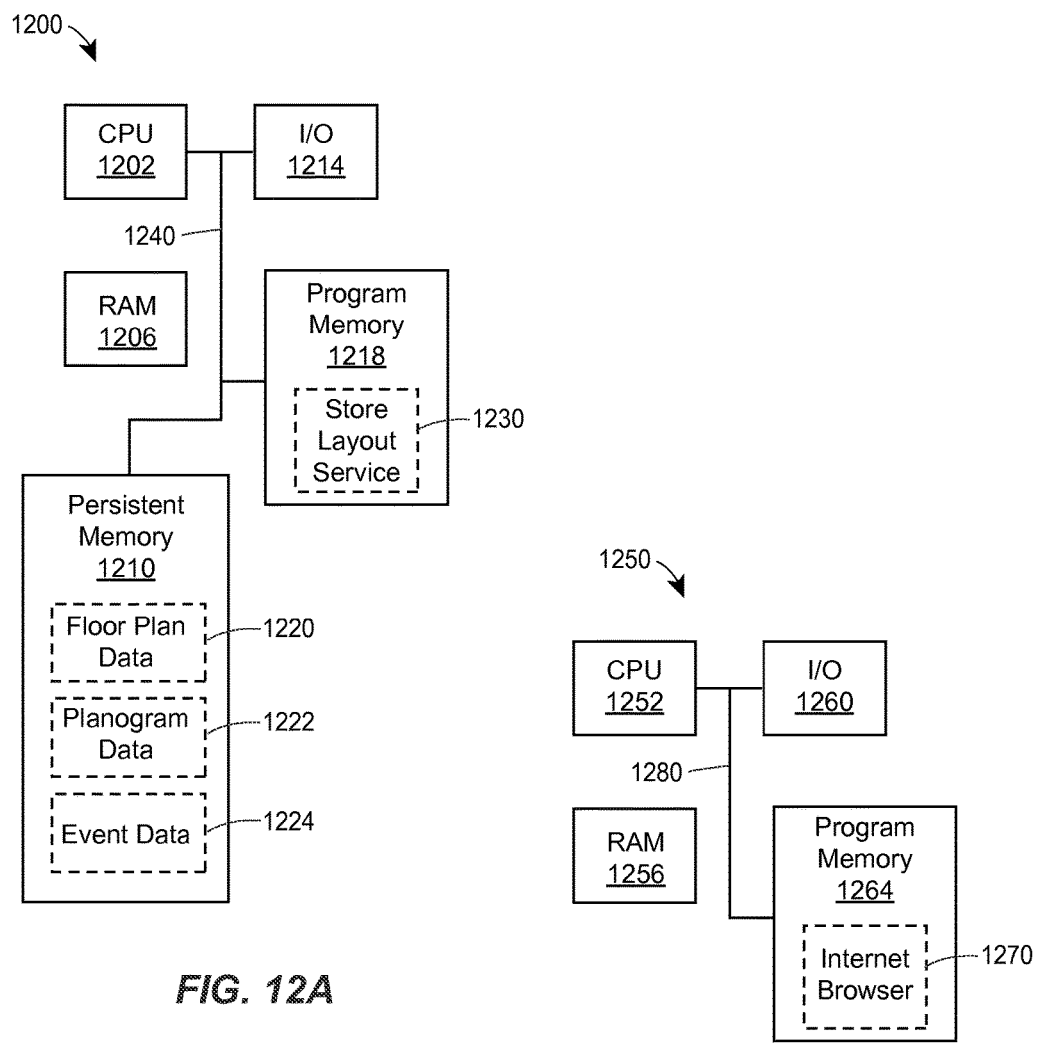
FIG. 12A illustrates an example computing device in which the store layout web server of FIG. 1 is implemented, according to an embodiment.
FIG. 12B illustrates an example computing device in which the client device of FIG. 1 is implemented, according to an embodiment.

FIG. 12A illustrates a diagram for an example store layout web server 1200 (such as the store layout web server 115 as discussed with respect to FIG. 1) in which the functionalities as discussed herein may be implemented. The store layout web server 1200 includes one or more process depicted as a central processing unit (CPU) 1202. During operation, the CPU 1202 executes instructions stored in a program memory module 1218 coupled to the CPU 1202 via a system bus 1240. In some implementations, the program memory module 1218 is implemented in a random access memory (RAM) module 1206, a persistent memory module 1210, or both. The program memory module 1218 may also store computer-readable instructions that regulate the operation of the store layout web server 1200. One set of instructions may be a store layout service 1230 that contains instructions to facilitate planogram assignments, planograms searches, and event interactions as discussed elsewhere herein. The sets of instructions may be implemented in any desired language, and may be implemented as machine code, assembly code, byte code, interpretable source code or the like (e.g., via C, C++, Java, Actionscript, Objective-C, Javascript, CSS, XML). It should be appreciated that the program memory module 1218 may store other sets of instructions, for example, an operating system that regulates communication between the various modules contained within store layout web server 1200.

In addition to programs, the modules 1206 and 1210 may store data in a volatile or non-volatile mode, respectively. The modules 1206 and 1210 may further include one or more forms of fixed and/or removable memory, such as read-only memory (ROM), electronic programmable read-only memory (EPROM), RAM, erasable electronic programmable read-only memory (EEPROM), and/or other hard drives, flash memory, MicroSD cards, and others. For example, floor plan data 1220 (which may be similar to the floor plan database 130 of FIG. 1), planogram data 1222 (which may be similar to the planogram database 120 of FIG. 1), and event data 1224 (which may be similar to the event database 125 of FIG. 1) may be stored as data structures in the persistent memory module 1218. During operation, some or all of the data 1220, 1222, and 1224 may be loaded into the RAM module 1206 via the system bus 1240.

The store layout web server 1200 may further include an I/O module 1214. The I/O module 1214 may include components that enable the store layout web server 1200 to send and receive data over a wireless or wired network (such as network 110 of FIG. 1). The components may include one or more transceivers (e.g., WWAN, WLAN, WPAN, EVDO, CDMA, GSM and/or LTE transceivers) functioning in accordance with IEEE standards, 3GPP standards, or other standards. In addition to the transceivers, the I/O module 1214 may include display screens, keys, buttons, touch sensitive input panels, external ports or other components that enable someone to interact with the store layout web server 1200, such as to upgrade the instructions contained in the store layout service 1230.

Although the store layout web server 1200 is shown to include one CPU 1202, it should be understood that the processing may be distributed among a plurality of servers in an arrangement known as "cloud computing." This configuration may provide several advantages, such as, reducing the load on any particular CPU, for example, by enabling parallel processing of instructions that can be divided into non-sequential steps. This parallel processing reduces the overall processing time required to perform the functionality described herein and improves the user experience on client devices that interact with the store layout web server 1200.

FIG. 12B illustrates a diagram for an example client device 1250 (such as the client device 105 as discussed with respect to FIG. 1) in which the functionalities as discussed herein may be implemented. The client device 1250 includes one or more process, depicted as a CPU 1252. During operation, the CPU 1252 executes instructions stored in a program memory module 1264 coupled to the CPU 1252 via a system bus 1280. In some implementations, the program memory module 1264 is implemented in a random access memory (RAM) module 1256. The program memory module 1218 may also store computer-readable instructions that regulate the operation of the client device 1250. One set of instructions may be an internet browser 1270 that contains instructions to facilitate interactions with a webpage corresponding to a web server hosting a store layout service. It should be appreciated that the program memory module 1264 may store other sets of instructions, for example, an operating system that enables the user to execute other programs on the client device 1250.

The client device 1250 may further include an I/O module 1260. The I/O module 1260 may include components that enable the client device 1250 to send and receive data over a wireless or wired network (such as network 110 of FIG. 1). The components may include one or more transceivers (e.g., WWAN, WLAN, WPAN, EVDO, CDMA, GSM and/or LTE transceivers) functioning in accordance with IEEE standards, 3GPP standards, or other standards. In addition to the transceivers, the I/O module 1260 may include display screens, keys, mice, buttons, touch sensitive input panels, external ports or other components that enable someone to interact with the client device 1250, such as to interact with an interface presented by the internet browser 1270.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

What is claimed:

1. A method for assigning a planogram to a fixture associated with a floor plan in a store layout and planning software environment, the method executed by one or more computer processors particularly programmed to perform the method, the method comprising:
   receiving, from a client device via a communication network, a first indication that a user has attempted to relocate a selected planogram, wherein the planogram is a diagram that indicates at least where and in what quantity items should be placed on a fixture;
   receiving, from the client device via the communication network, a second indication that the user has selected a target fixture corresponding to the floor plan to which the planogram will be assigned;
   in response to receiving the second indication, determining, by the one or more computer processors, a location on the fixture that the planogram will be placed by analyzing the second indication to determine a location on the fixture on which the user has clicked, the location being:
   i) the left side of an already assigned planogram associated with the target fixture,
   ii) the right side of an already assigned planogram associated with the target fixture, or
   iii) an empty space on the target fixture;
   based on the determined click location, updating, by the one or more computer processors, the floor plan to represent that the selected planogram has been assigned to the target fixture and placed at the determined location; and
   transmitting, to the client device via the communication network, data representative of the updated floor plan.

2. The method of claim 1, wherein the first indication includes at least one of:
   an identification of the selected planogram and an indication that the user is attempting to move the selected planogram.

3. The method of claim 1, wherein the second indication includes at least one of:

an identification of the target fixture and coordinates associated with the interface representative of the location on the interface that the user has clicked a mouse or touched a screen.

4. The method of claim 1, wherein the target fixture comprises:
a regular fixture, an irregular fixture, an end stand, a side panel, a dump table and a counter.

5. The method of claim 1 wherein updating the floor plan comprises:
assigning, by the one or more processors, the selected planogram to the target fixture in a database corresponding to the floor plan.

6. A computer device for assigning planograms on a floor plan in a store layout and planning software environment, the computer device comprising:
a communication module;
one or more processors; and
one or more non-transitory memories coupled to the one or more processors,
wherein the one or more non-transitory memories include computer executable instructions stored therein that, when executed by the one or more processors, cause the one or more processors to:
receive, via the communication module, a first indication that a user has attempted to relocate a selected planogram, wherein the planogram is a diagram that indicates at least where and in what quantity items should be placed on a fixture;
receive, via the communication module, a second indication that the user has selected a target fixture corresponding to the floor plan to which the planogram will be assigned;
in response to receiving the second indication, determine a location on the fixture that the planogram will be placed by analyzing the second indication to determine a location on the fixture on which the user has clicked, the location being:
  i) the left side of an already assigned planogram associated with the target fixture,
  ii) the right side of an already assigned planogram associated with the target fixture, or
  iii) an empty space on the target fixture;
based on the determined click location, update the floor plan to represent that the selected planogram has been assigned to the target fixture and placed at the determined location; and
transmit, via the communication module, data representative of the updated floor plan.

7. The computer device of claim 6, wherein the first indication includes at least one of:
an identification of the selected planogram and an indication that the user is attempting to move the selected planogram.

8. The computer device of claim 6, wherein the second indication includes at least one of:
an identification of the target fixture and coordinates associated with the interface representative of the location on the interface that the user has clicked a mouse or touched a screen.

* * * * *